UNITED STATES PATENT OFFICE.

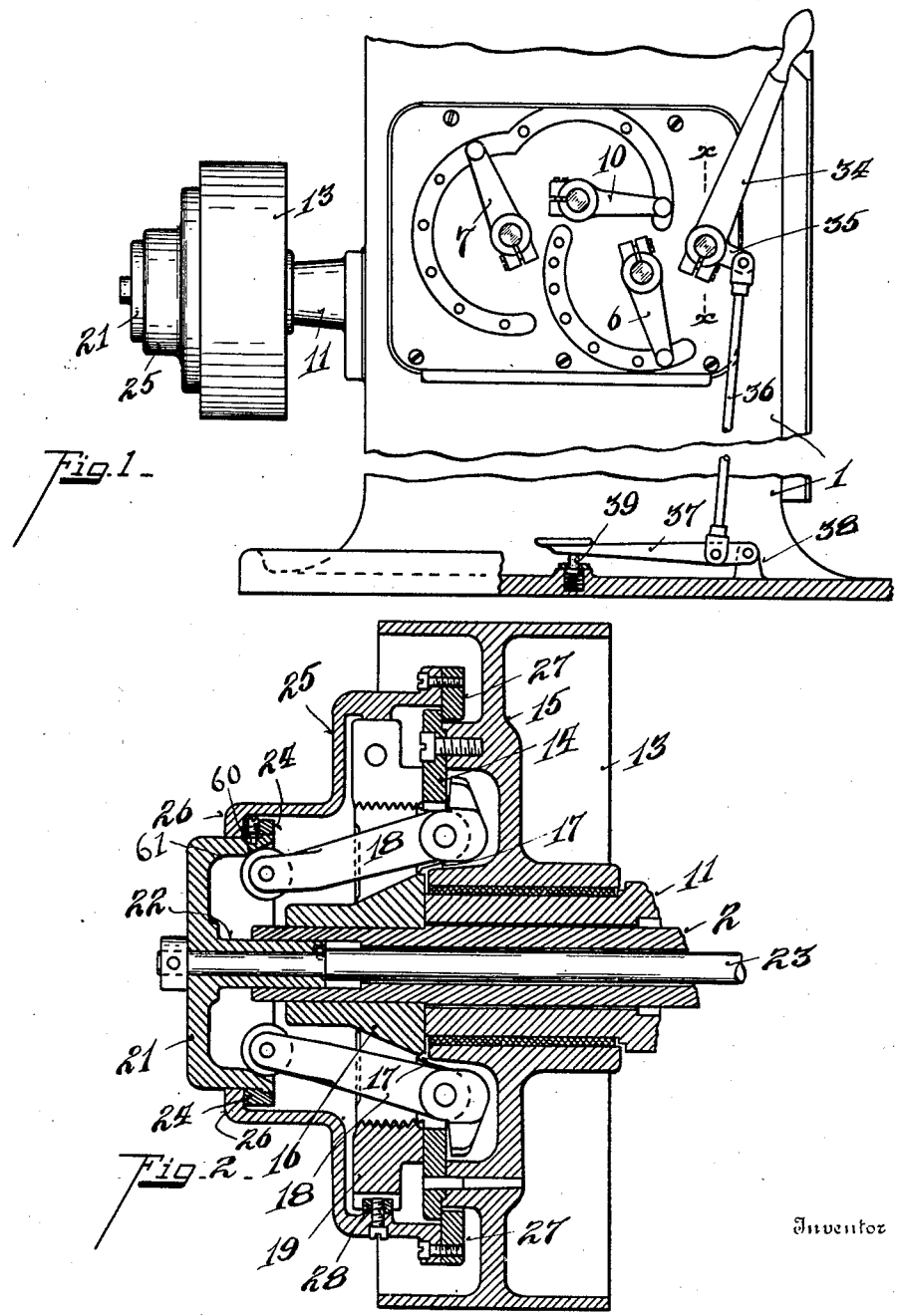

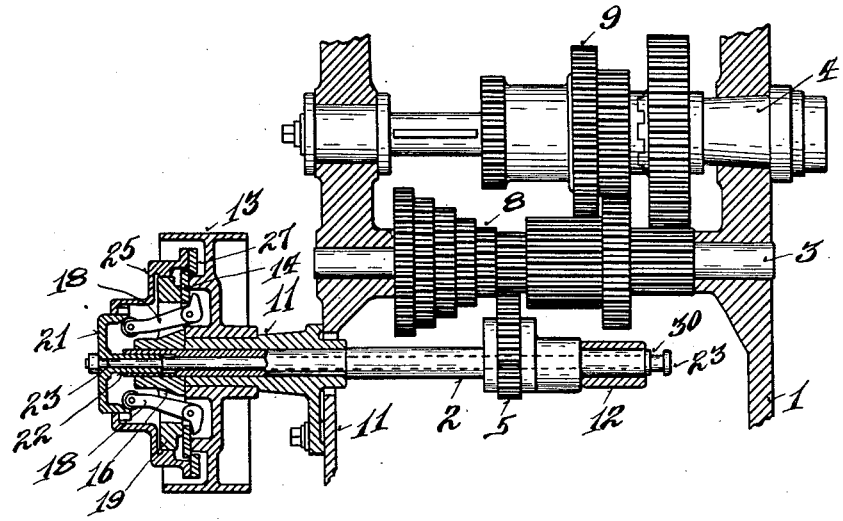
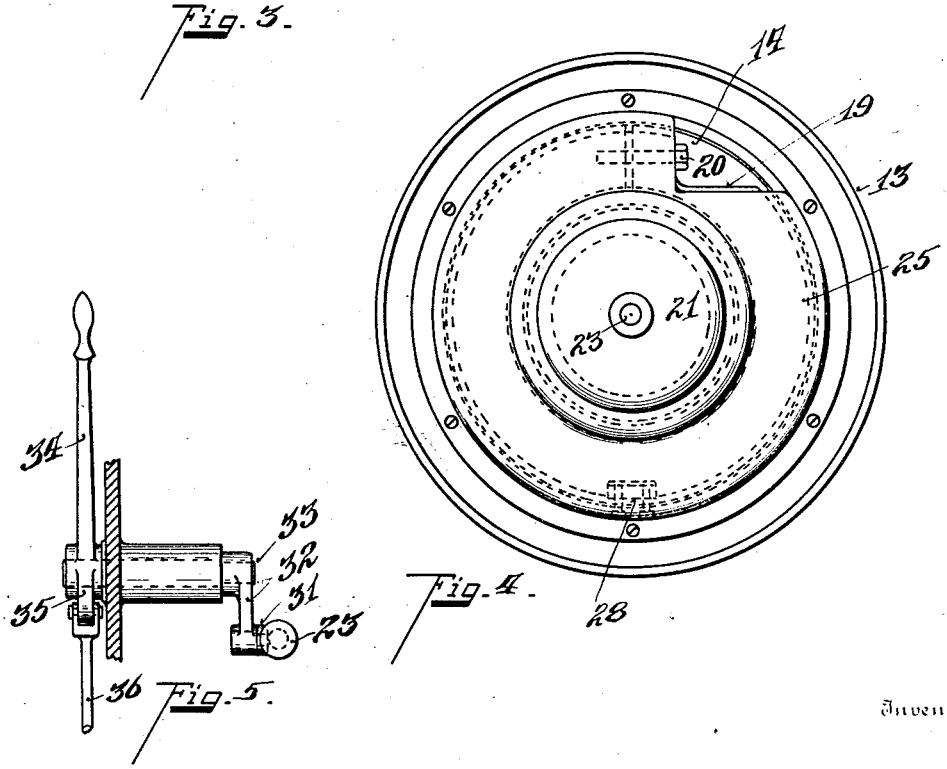

ADOLPH L. DE LEEUW, OF HAMILTON, OHIO, ASSIGNOR TO THE CINCINNATI MILLING MACHINE COMPANY, OF CINCINNATI, OHIO, A CORPORATION.

VARIABLE-SPEED DRIVING MECHANISM.

943,142.

Specification of Letters Patent. Patented Dec. 14, 1909.

Application filed October 7, 1907. Serial No. 396,238.

*To all whom it may concern:*

Be it known that I, ADOLPH L. DE LEEUW, a citizen of the United States, residing at Hamilton, in the county of Butler and State of Ohio, have invented certain new and useful Improvements in Variable-Speed Driving Mechanisms, of which the following is a specification.

My invention relates to a drive for a variable speed device, the principle of which permits the shifting and intermeshing of gears to be effected under conditions of low speed wholly within the control of the operator.
In devices of this character in which a shifting gear is selectively intermeshed with different diameter gears, it is impossible to insure a clean and safe intermeshing operation unless one of the members (driving or driven) is in motion. It is of course impossible to safely effect this intermesh when the gears are running at normal speeds, and consequently there have been many attempts made to produce a slowing down device for one of the members, which would reduce its speed to a point where the intermesh can be safely made. Such attempts have not resulted in a device satisfactory under all conditions.
In my invention I produce a device in which, when a speed change is to be made the driven member is entirely disconnected from the drive, the motion of driving member is converted from high to low speed without shock or strains, and the low speed is under the direct and perfect control of the operator, so that he can practically produce that ideal condition for gear intermeshing in which the driving member has just sufficient motion to insure a clearance of its teeth with the teeth of the member to be engaged. In practice this speed is so low as to be hardly appreciable, but the realization of this condition enables the intermesh to be made safely and accurately without any clashing of gears or undue shocks or strains.

In carrying out this invention I have further adapted it to be effected through the actuation of a single control for the greater convenience of the operator and efficiency of the operation. In the preferred form of construction and as exemplified in the drawings, I accomplish these results through the instrumentality of a double acting clutch, which at low speed acts on the principle of a slipping friction clutch manually controlled by the operator, so as to impart to the driving gear that crawling motion which insures the accurate and safe intermesh of the gears. The high speed end of the clutch may be either of the positive or friction type.

Thus in the operation of my device when the lever throws out the high or normal speed it can be moved to a further position for throwing in the slipping friction drive, this further movement being preferably effected however by a treadle connection, which leaves the operator the free use of his hands for manipulating the shifting parts of the variable speed device.

Various other features of my invention will be more fully set forth in the description of the accompanying drawings, forming a part of this specification, in which:—

Figure 1 is a side elevation of a portion of a milling machine, illustrating the shifting levers for a system of change gearing, and the main and the auxiliary power controlling lever. Fig. 2 is an enlarged central vertical section through the driving pulley and friction clutch mechanism. Fig. 3 is a sectional elevation through the driving pulley and system of speed change gearing. Fig. 4 is an enlarged end elevation of the driving pulley and clutch mechanism. Fig. 5 is a section on line $x$, $x$, Fig. 1.

1 represents the main frame of the machine in which is journaled the main shaft 2, the intermediate shaft 3 and the driven shaft 4. The shaft 2 carrying the tumbler gears 5 is controlled and shifted longitudinally and laterally by the levers 6, 7, respectively, see Figs. 1 and 3. The shaft 3 is provided with a series of gears 8 of different diameter mounted in a fixed position upon said shaft 3. The driven shaft 4 is provided with a series of gears 9 of different diameter shifted longitudinally so as to be brought into proper relation with the respective gears on the shaft 3 by means of the shifting lever 10. The system of gear transmission for effecting various speeds to the driven shaft 4, may be of any desired type, and I do not wish to limit myself to the particular arrangement shown.

The principal feature with reference to the varying speed arrangement is such that a slow speed may be imparted to the gearing thus enabling a free and easy shifting, not possible with the gears at rest or running at a high speed.

11 represents a sleeve projecting from the frame 1 through which the shaft 2 is projected and journaled and 12 represents a bracket or journal for the opposite end of the shaft 2.

13 represents a pulley loosely journaled upon the free end of the sleeve 11 provided with a ring 14 fixed to the web 15 of the pulley 13. This ring is preferably made of hardened steel and forms a clamping surface for the clutching mechanism when the pulley wheel is clutched to the driving shaft 2.

16 represents a clamp arm supporting frame or hub fixed to the shaft 2 provided with the ears 17 between which the clutch arms 18 are pivoted.

19 represents a clamp collar screw threaded upon the periphery of the frame 16 and is of split form adapted to be clamped by means of the bolt 20, so as to securely lock the same upon the frame 16, through which frame the auxiliary drive is transmitted to the shaft 2.

21 represents a clamp arm actuating disk provided with a projecting sleeve 22 slidably mounted within a bore formed in the free end of the shaft 2, see Fig. 2, and 23 represents an actuating rod passing through a bore formed in the shaft 2, one end of said rod being fixed to the clamp arm actuating disk 22, the opposite end provided with means, to be hereinafter more fully described, for engagement with the controlling lever mechanism.

24 represents a collar fixed upon the periphery of the disk 21.

25 represents a sleeve provided with a flange 26, adapted to bear against the collar 24.

27 represents a ring fixed to the opposite end of the sleeve 25, said ring being adapted to be brought into frictional contact with the ring 14.

28 represents a key fixed to the sleeve 25 and fitting into a slot formed in the clamping collar 19.

The disk 21 is provided with an angular peripheral surface against which the arms 18 contact. Thus it will be seen that when the disk 21 is moved to the right by means of the actuating rod 23, the contacting ends of the clamping arms 18 are moved together bringing their opposite ends through their pivotal action, against the friction ring 14, thereby transmitting power from the pulley 13 to the driving shaft 2, which constitutes the main drive. The low speed drive is imparted from the pulley 13 to the shaft 2 by moving the actuating rod to the left, bringing the collar 24 on the disk 21 into frictional engagement with the flange 26 of the sleeve 25, likewise bringing the ring 27 into frictional engagement with the ring 14. Of course it is obvious that if sufficient pressure were applied to the actuating rod 23 in such direction, the auxiliary drive could be made a more powerful one, but by bringing the mechanism into slight frictional engagement slippage is caused between the meeting surfaces, thereby producing a slower speed than that of the driving pulley 13 to the shaft 2 and sufficient power to revolve the gears of the speed changing system to effect an easy shifting of the change gears, but not enough to cause breakage of the variable speed gearing.

The parts 21, 22, 23, 24, 25, 26 and 27, considered as an entirety, form an auxiliary moving member with reference to shaft 2, though, of course, the part 27 constitutes the friction surface. The parts 21, 26 and 25 also form a hood or housing telescoping within the broad rim of the driving wheel 13, which makes a very compact, protected and sightly device. When the ring 27 engages the ring 14 the frictional tension is directly responsive to the force exerted by the operator on rod 23, giving a selective tension of a light character just sufficient to put the shaft 2 in motion, so that he can manipulate the tumbler under the proper conditions, irrespective of the rate of travel of the wheel 13.

When member 21 is moved inwardly, its angular or inclined inner peripheral edge 60 engages the outer end of the levers 18, compressing them toward one another and forcibly clamping the outer ends of these levers against the ring 14. As soon as this member 21 has moved inwardly until the outer ends of levers 18 pass beyond these inclined shoulders 60 and ride upon the uniform inner peripheral surface 61 of this disk 21 the maximum compression has been reached and the frictional tension is definite because independent of the degree of force exerted upon the rod 23. This operation of the levers 18 mechanically compounds the force exerted by the operator in sliding rod 23. The result of this structure is a double alternative friction clutch, in one movement giving a selective friction tension suitable for safely engaging variable speed gears, and when moved in the other direction giving a definite tension compounding the force of the operator, and a friction drive precalculated to constitute the normal driving tension of the machine.

It is desirable to control the low speed drive by a treadle in order that the operator may have free use of both hands for manipulating the speed changing levers, and it is also desirable that this power or drive be brought into action after the main drive has been stopped for it avoids the possibility of throwing the main drive into action during a speed change manipulation.

The control of the main and auxiliary drive is accomplished by the following instrumentalities:—30 represents an annular groove formed in the actuating rod 23 into which the roller 31 engages, said roller being supported upon the lever 32, which in turn is fixed to stud shaft 33 suitably supported in the frame of the machine. 34 represents a lever fixed to the stud shaft 33. The rod 23 moves axially to alternately operate either clutch, and therefore the common controller. Thus it will be seen that by throwing the lever 34 to the left the actuating rod 23 will be moved to the right, throwing in the main drive. 35 represents an ear projecting from the lever 34. 36 represents a connecting rod provided with bifurcated ends, one end of which is pivotally connected to the ear 35, the opposite ends to the treadle 37, said treadle being pivotally connected to the ear 38 projecting upwardly from the base of the frame 1. 39 represents a spring controlled stem bearing against the treadle 37 for automatically bringing the lever 34 to its position of rest after the treadle 37 has been depressed and a proper change of speed effected.

The ring 14 carried by wheel 13 is the member to be clutched in both light and heavy friction drives. The light friction clutching member consists of the parts 21, 24, 25 and 27 forming a housing for the end of the shaft and wheel. This light friction clutching member is slidable on shaft 2 and manually operated by manipulating rod 23. The heavy friction clutching member consists of hub 16 and clamp arms 18 actuated by the shifting of the disk 21. In the outermost position of rod 23 the light friction clutch is in commission. In the innermost position the heavy friction clutch is in commission and between the two extremes is a position in which the drive is entirely out.

In the practical operation of my device, it is important that the light clutch involve a selective tension, that is, that it shall be directly responsive to the force exerted by the operator, so that guided by the sense of feel he may give the driven member a suitable speed for a safe gear intermeshing irrespective of the particular speed of the driving member. It is further important that the alternative clutch for connecting the driving and driven elements at the same speed shall involve a definite clutching action. Preferably, this definite engagement is produced by the wedging action of the member 21 with the lever arm 18, which compounds the force of the operator and powerfully clamps the inner end of the lever 18 against the ring of the driving wheel. It is also important that these clutches be independently operated by a common actuating device moving into alternative positions. In the one case, the operator moves the light clutch axially relative to the shaft with a manually controlled tension which permits him to obtain a driving speed selective for the purpose of intermeshing the gears. In the other case, the axially moving member is shifted to disengage the light clutch and a complete throw of the lever in the opposite direction actuates the wedge and lever to clamp the driving and driven members together under a definite tension. In other words, under a tension which will drive the machine without slippage between the clutch surfaces engaged.

Having described my invention, I claim:—

1. In a device of the class described, a driving and a driven element, a member to be friction clutched on one of said elements, two independent friction clutching members on the other element adapted to alternately engage the member to be clutched, means for operating one of said clutches with a selective tension, and the other clutch with a definite tension, and a common actuating member controlling said means having an intermediate neutral position and operating in opposite directions of movement to independently control said friction clutches.

2. In a device of the class described, a driving and a driven member, a ring to be friction clutched on one of said members, a friction clutching member on the other member adapted to engage said ring with a selective tension, a lever clamping clutch mechanism adapted to engage said ring with a definite tension, means for shifting the selective tension clutching member, and connections between the selective and the definite clutching members, whereby they may be alternatively operated.

3. In a device of the class described, alternative friction clutches, a common controller therefor, having an intermediate neutral position and movable in opposite directions, means whereby one of the clutches is operated with a selective friction tension when the controller is moved in one direction and means whereby the other clutch is operated with a definite friction tension when the controller is moved in the opposite direction.

4. In a device of the class described, a wheel, a ring to be friction clutched thereon, a shaft to be connected to the wheel, a friction clutching member for the ring axially movable on the shaft, a lever friction clutching member rotatable with the shaft and adapted to clamp the ring, means whereby the axially movable member is caused to actuate said lever friction clutching member, and means for shifting said axially movable member in opposite directions.

5. In a device of the class described, a driving and a driven member, a ring to be clutched on one of said members, alternative clutching devices on the other element, one of said clutches comprising an axially moving member adapted to clutch the ring with selective tension, the other clutch device comprising a lever adapted to definitely clamp the ring, and means for independently actuating said clutches from an idle position to connect said wheel and shaft under a light or heavy tension.

6. In a device of the class described, a wheel, a member to be friction clutched thereon, a selective friction clutch member axially movable on the shaft, a lever friction clutch on the shaft adapted to definitely clamp the member to be clutched, a wedge connected with the selective clutching member adapted to engage and actuate the lever clutch, and means for shifting the axially moving member in opposite directions to alternately actuate said selective and definite clutches.

7. In a device of the class described, a driving element, a member to be clutched thereon, a driven element, an axially moving clutching member on the driven element, a lever clamp clutching member also on the driven member, and means for operating the axially moving member with a selective tension and laternately operating the lever clamp with a definite tension.

8. In a device of the class described, a member to be friction clutched, two friction clutching members therefor, means for bringing one of said friction clutches into engagement with a tension responsive to the force exerted by the operator, means for compounding the force exerted by the operator in bringing the other friction clutch into engagement, to constitute the normal drive of the machine, and means adapted to alternately operate said two friction clutches.

9. In a device of the class described, a driving and a driven member, a member to be friction clutched, a friction clutching member therefor engageable under selective tension to rotate the member to be clutched at a relatively low speed, a second friction clutching member engageable under definite tension to rotate the member to be clutched at the speed of the driving member for the normal operation of the machine, and mechanism connecting said clutching members for alternately engaging them with the member to be clutched.

10. In a device of the class described, a driving and a driven member, a friction clutch engageable under selective tension to rotate the driven member at a relatively low speed, a second friction clutch engageable under definite tension to rotate the driven member at the speed of the driving member for the normal operation of the machine, both of said clutches being arranged to rotate the driven member in the same direction, and mechanism adapted to alternately operate said clutches.

In testimony whereof, I have hereunto set my hand.

ADOLPH L. DE LEEUW.

Witnesses:
OLIVER B. KAISER,
LEO O'DONNELL.